Patented July 10, 1934

1,966,279

UNITED STATES PATENT OFFICE 1,966,279

WATER PURIFICATION

Abraham Sidney Behrman, Chicago, Ill., assignor to General Zeolite Co., Chicago, Ill., a corporation of Illinois No Drawing. Application December 19, 1931, Serial No. 582,182

6 Claims. (Cl. 210—9)

This invention relates to the treatment of liquids, and particularly to the purification of ferruginous waters.

As is well known, iron is an extremely objectionable impurity in domestic and industrial water supplies when present in an amount in excess of 0.1 or 0.2 parts per million. Since the iron content of many natural waters is greatly in excess of this limiting concentration, the problem of iron removal in such cases is an extremely important one.

The manifestations of an excessive amount of iron in water are so many and so familiar that only passing mention of them need be made here. In addition to possessing a disagreeable taste, the water in due course becomes "rusty" with ferric hydroxide and leaves a deposit of this substance upon nearly every surface with which the water comes in contact. Plumbing fixtures are stained. Laundry work is spotted. Many foods and beverages are spoiled. Dyes and colors may be precipitated. These and other deleterious effects of iron-bearing waters are now generally appreciated and understood.

Iron is found in objectionable quantity principally in ground water supplies that are devoid of oxygen. In such waters the iron is generally assumed to be present as ferrous bicarbonate. It is characteristic of such waters that they are quite clear when drawn, but more or less rapidly become cloudy and discolored due to the oxidation of the ferrous iron and the precipitation of the insoluble ferric hydroxide resulting from hydrolysis of the ferric compound.

Heretofore the methods of removing iron from ground waters of this type have for the most part followed the natural procedure above suggested, that is, the water is aerated to permit oxidation of the ferrous iron, and the ferric hydroxide thus formed is subsequently removed by sedimentation and filtration. Since ferrous iron in water will usually not be oxidized completely even in the presence of oxygen at a pH much below about 5.5, lime or some other alkali is sometimes added to insure satisfactory oxidation and precipitation of the iron.

One of the principal disadvantages of this generally employed method of iron removal is that as a result of the open system used the aerated and filtered water must be repumped. The majority of ground water supply installations are based on employing only one pump for bringing the water to the surface and delivering it to an elevated storage tank and/or the community distribution system. In addition to the tanks and other equipment required for an aeration system of the type described it is obvious that the employment of such a system will frequently necessitate a second pumping not otherwise required.

Another objection to the aeration method of iron removal is that the aerated water is usually substantially saturated with oxygen, thus providing a potential cause of corrosion of piping which in some cases may result in a higher iron content of the water than that originally present.

Closed systems of aeration have been proposed, but have not gained wide acceptance. In a typical method of this sort air under pressure is forced continuously into a closed tank through which the iron bearing water is passing; the air is subsequently separated from the water by means of an air vent or other appropriate device, and the water is passed through a sand filter to remove any ferric hydroxide formed as a result of the aeration. Some of the more obvious disadvantages of such a system are the expense of installing and operating the air compressor equipment, the relative inefficiency of the system, and the difficulty of adjusting the extent of aeration to a fluctuating rate of flow of water through the purifying system.

Chemical methods of iron removal have also been utilized to a limited extent; but such methods have in all cases been entirely dependent upon the application of chemical reagents.

It would obviously be very advantageous to employ a method of iron removal which would operate in a closed system, wherein the water is not exposed to the atmosphere, and where there is no substantial loss of hydraulic pressure. If to these advantages could be added freedom from chemical dosage and expense, and from complicated mechanical devices, the desirability and utility of such a method would be further increased.

To provide a method of iron removal possessing these desirable characteristics is the principal object of this invention. Other objects of the invention will become apparent upon the further reading of this specification and of the appended claims.

The process of iron removal comprising the present invention has its basis in my discovery that certain substances, and particularly certain forms of carbon, have the property of adsorbing ferrous iron from water, while ferric iron is much less readily adsorbed, if at all; and that the adsorbed ferrous iron may be removed from the adsorbent by oxidation to the ferric condition, whereupon the ferric hydroxide obtained may be removed by simple washing or by other appropriate means, that will be referred to later in this specification.

While all the experimental evidence available appears to support very conclusively the theoretical basis for the process just set forth, it should be understood that the process itself as described herein is fully operative regardless of the accuracy of this theory, and my invention is not to be limited by or made contingent upon this theoretical explanation.

A clearer idea of my invention and the manner of using it may be obtained from the following example. The adsorbent used may be a granular activated carbon manufactured from certain Texas lignites. A bed of the carbon of suitable depth—usually 24 to 36 inches—is contained in a pressure unit similar in construction to a pressure sand filter or zeolite softener. The carbon is supported in the usual fashion by a layer of graded gravel. In addition to the usual and necessary valves and appurtenances employed with pressure units of this kind, the metal shell containing the carbon bed is given an interior lining of a dielectric material which will prevent the formation of a galvanic couple between the metal of the container and the activated carbon (see Brandt, U. S. Patent 1,781,314, issued November 11, 1930). It is also generally desirable that the interior construction of the unit should be resistant to dilute solutions of mineral acids, as will be shown later.

In carrying out the process of the invention with the unit just described, the iron-bearing water is delivered through a closed system to the carbon unit through which it is passed at a suitable rate, usually from one to three gallons per minute per square foot of carbon bed area. The flow of water through the carbon bed may be either upward or downward, but in general downward flow will be found preferable.

The flow of water through the carbon bed is stopped when the iron content in the effluent reaches 0.2 or 0.3 parts per million or any other predetermined maximum. Through manipulation of the proper valves, the carbon bed is now drained substantially free of water, so that the interstices between the carbon particles are filled with air. It is this air which now performs the second step in the process, that is, the oxidation of the adsorbed ferrous iron to the ferric condition. This oxidation is accomplished most simply merely by letting the drained carbon bed remain in contact with the air for a suitable period, as for example, one hour.

At the end of the period of exposure to air, which may be called a regenerating treatment, the carbon bed is now backwashed with water to remove the ferric hydroxide. As soon as the wash water becomes substantially free from suspended particles of ferric hydroxide, the washing operation is stopped, and, by manipulation of the proper valves, the unit is again ready to function in the removal of ferrous iron from further quantities of water that may be passed through it.

I have found that the adsorptive capacity of certain substances for ferrous iron is remarkably high, and that this adsorption will function even under conditions which would ordinarily be considered quite unfavorable. For example, it was found that the activated carbon mentioned above would very successfully remove ferrous iron from a dilute ferrous sulphate solution having a pH as low as 3.8 to 4.0; and under these conditions, the carbon was found to adsorb ferrous iron in an amount well in excess of one milligram of iron per gram of the carbon. Assuming the activated carbon in question to weigh approximately twenty pounds per cubic foot, the adsorption capacity for ferrous iron just mentioned would be sufficient for the removal of one part per million of iron from about twenty-four hundred gallons of water for each cubic foot of the carbon. With solutions of higher pH, such as normally alkaline ferruginous waters, even larger amounts of ferrous iron have been found to be adsorbed.

It can be demonstrated definitely that iron is adsorbed in the ferrous condition by extracting the "exhausted" adsorbent with a solution of an acid and examining the extract for ferrous iron.

There is considerable latitude in the amount of aeration or regeneration of the carbon bed which may be employed advantageously. Within certain limits, the degree of regeneration increases with lengthened time of aeration. For example, the regular adsorptive capacity of a given carbon bed when using a one hour regeneration period was found to be only about half that obtained with twenty-four hours' aeration; while regeneration for only a half hour gave a capacity approximately half that obtained with one hour's regeneration. The increased capacity obtained with longer period of regeneration suggests the use of duplicate units, one of which is being regenerated while the other is in service.

It is also possible to employ for the aeration an amount of air in excess of that normally filling the voids between the particles of adsorbent, as for example by aspirating or blowing air through the bed. Another method of regeneration successfully employed is to use one cycle of aeration and backwashing, followed by one or more additional series of these steps. Still another method is to employ a combined air and water wash.

After a large number of adsorption runs have been made, followed in each case by regeneration with air and backwashing, it will sometimes be found desirable to treat the adsorbent with a solution of an acid or other suitable substance for the purpose of removing any residual unoxidized adsorbed ferrous iron and any ferric hydroxide which has not been washed off the particles of the adsorbent. Only a dilute acid is generally required for this purpose; I have used a solution of sulphuric or hydrochloric acid as weak as 0.25 Normal quite successfully, though stronger solutions may also be employed. The treatment with acid should of course be followed by washing with water.

When the water to be purified contains appreciable amounts of suspended matter, it will usually be found advantageous to precede the adsorption unit with a pressure sand filter, using in connection with it a coagulant to facilitate the removal of the suspended matter. When the amount of suspended or colloidal matter is quite small, however, as for example such as might result from an accidental oxidation of a small portion of the iron content of the water prior to its delivery to the adsorption unit, it will frequently be found economical to omit this prefiltration, and to deliver the water directly to the adsorption unit which, in this case, should preferably be operated with a downward flow of water in order to take advantage of the filtering action thus provided.

It is characteristic of most iron-bearing ground waters that their pH and calcium carbonate content are sufficiently high to insure the deposition of a protective coating on the internal surfaces of iron piping, and thus inhibit corrosion. If, however, such is not the case, I have found it advantageous to pass the substantially iron-free effluent from the purification system described in the foregoing through a bed of crushed limestone or marble, contained in a closed tank, for the purpose of substantially saturating the water with calcium carbonate and so avoiding subsequent corrosion.

While very excellent results have been obtained using as an adsorbent for ferrous iron the activated carbon previously described, other adsorbents may also be employed for the purpose. Among such substances which have been found to have decided, though varying, adsorptive capacities for ferrous iron may be mentioned other forms of carbon such as wood charcoal, boneblack, and other activated and active carbons, as well as silica gel and zeolites. In the appended claims, the term "adsorbent" is used generically to designate any substance capable of functioning as the equivalent of the adsorbents specifically indicated herein. Other methods of regeneration other than those described may also be employed. For example, while it is obviously preferable as a rule to accomplish the regenerating oxidation by the simple and inexpensive means of aeration, I have found that highly successful regeneration can also be accomplished by treating the adsorbent with a solution of an oxidizing agent, such as sodium or calcium hypochlorite, hydrogen peroxide, or other equivalent reagent.

It is also probable that other ions capable of multiple valence will be found which, like iron, are adsorbed when in a condition of lower valence, and are not adsorbed when oxidized to a higher valence—or, conversely, are adsorbed more readily when in a higher state of valence than in a lower state. It is obvious too that the processes described in the foregoing are not limited to the purification of water, but may be applied to the treatment of aqueous solutions in general, as for example to the removal of iron from aqueous solutions of aluminum sulfate or the alums. All such modifications and extensions of the basic processes herein disclosed are contemplated as coming within the purview of the invention as defined in the appended claims.

What I claim is:

1. A process of purifying ferruginous water which comprises contacting the water with a substance capable of adsorbing ferrous iron, regenerating the substance containing the adsorbed ferrous iron by means of the oxygen of the air, and removing the insoluble ferric compounds resulting from the regeneration.

2. A process of purifying ferruginous water which comprises contacting the water with a bed of a substance capable of adsorbing ferrous iron, regenerating the said substance by draining the said bed and thus exposing the adsorbent substance to contact with the air, and removing the insoluble ferric compounds resulting from the regeneration.

3. A process of purifying ferruginous water which comprises contacting the water with a substance capable of adsorbing ferrous iron, regenerating the substance containing the adsorbed ferrous iron, and removing the insoluble ferric compounds resulting from the regeneration, the treatment of the water being purified being carried out in a closed system out of contact with air.

4. The process of claim 1 wherein the adsorbent substance is activated carbon.

5. The process of claim 2 wherein the bed of adsorbent substance comprises particles of activated carbon.

6. The process of claim 3 wherein the adsorbing substance is activated carbon.

ABRAHAM SIDNEY BEHRMAN.